US010914288B2

(12) United States Patent
Hillebrandt et al.

(10) Patent No.: US 10,914,288 B2
(45) Date of Patent: *Feb. 9, 2021

(54) WIND TURBINE WITH AN ON-LOAD TAP CHANGER CONFIGURED WITH DYNAMIC FAULT CURRENT INJECTION

(71) Applicant: VESTAS WIND SYSTEMS A/S, Aarhus N (DK)

(72) Inventors: Jesper Hillebrandt, Ringkøbing (DK); Philip Carne Kjær, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,090

(22) Filed: Jul. 5, 2019

(65) Prior Publication Data

US 2020/0011297 A1 Jan. 9, 2020

(30) Foreign Application Priority Data

Jul. 4, 2018 (DK) .................................. 2018 70461

(51) Int. Cl.
*F03D 7/04* (2006.01)
*F03D 7/02* (2006.01)
*H02P 9/00* (2006.01)

(52) U.S. Cl.
CPC ............ *F03D 7/047* (2013.01); *F03D 7/0284* (2013.01); *F03D 7/048* (2013.01); *H02P 9/006* (2013.01)

(58) Field of Classification Search
CPC .................... H02P 13/06; F03D 9/255
(Continued)

(56) References Cited

U.S. PATENT DOCUMENTS 2,853,654 A * 9/1958 Swasey ..................... G05F 1/14
315/193
4,258,338 A * 3/1981 Peil .......................... H03K 3/30
331/111
(Continued)

FOREIGN PATENT DOCUMENTS

EP     2242159 A2    10/2010
EP     2333926 A2    6/2011
(Continued)

OTHER PUBLICATIONS

Extended European Search Report for Application No. 19184072.7-1202 dated May 12, 2019.
(Continued)

*Primary Examiner* — Pedro J Cuevas
(74) *Attorney, Agent, or Firm* — Patterson + Sheridan, LLP (57) ABSTRACT

The invention relates to a method for controlling a wind turbine configured with an on load tap changer transformer which enables adjustment of a current ratio of a primary side current of the transformer and a secondary side current of the transformer. The method comprises detecting that a network voltage on the primary side or secondary side of the transformer is outside a pre-determined voltage range, and in response determining a current reference for the primary side current based on the detected network voltage. The power converter of the wind turbine is controlled to generate an increase of the primary side current towards the current reference, and the current ratio of the transformer is adjusted towards a higher ratio of the current ratio.

15 Claims, 5 Drawing Sheets

(58) Field of Classification Search
USPC .................................................. 290/44, 55
See application file for complete search history.

(56) References Cited

U.S. PATENT DOCUMENTS

| | | | | |
|---|---|---|---|---|
| 4,276,510 | A * | 6/1981 | Tompkins | G01R 15/185 |
| | | | | 324/117 R |
| 4,338,649 | A * | 7/1982 | Mosier | H01H 47/007 |
| | | | | 361/139 |
| 6,037,728 | A * | 3/2000 | Petkovic | B60L 15/2045 |
| | | | | 318/364 |
| 6,486,641 | B2 * | 11/2002 | Scoggins | H01F 29/00 |
| | | | | 323/257 |
| 6,573,691 | B2 * | 6/2003 | Ma | H02J 3/1864 |
| | | | | 323/209 |
| 7,447,568 | B2 * | 11/2008 | Christensen | H02H 3/025 |
| | | | | 361/18 |
| 7,859,862 | B2 * | 12/2010 | Lin | H02M 3/33523 |
| | | | | 363/21.12 |
| 8,519,681 | B2 * | 8/2013 | Mathewson | G05F 1/14 |
| | | | | 323/257 |
| 8,552,701 | B2 * | 10/2013 | Navarro | H02J 3/1878 |
| | | | | 323/282 |
| 8,941,348 | B2 * | 1/2015 | Mirzaei | H02H 3/253 |
| | | | | 318/77 |
| 9,183,983 | B2 * | 11/2015 | Liffring | H02J 50/12 |
| 9,519,299 | B2 * | 12/2016 | Daley | G05F 1/14 |
| 9,676,351 | B2 * | 6/2017 | Shander | H02J 3/381 |
| 9,973,123 | B2 * | 5/2018 | Klodowski | H02J 3/381 |
| 10,493,930 | B2 * | 12/2019 | Shander | H02J 3/381 |
| 10,707,766 | B2 * | 7/2020 | Radic | H02M 1/34 |
| 10,763,768 | B2 * | 9/2020 | Hu | H02M 1/10 |
| 10,770,977 | B2 * | 9/2020 | Phadke | H02M 3/33546 |
| 2003/0076075 | A1 * | 4/2003 | Ma | H02J 3/1864 |
| | | | | 323/209 |
| 2007/0118831 | A1 * | 5/2007 | Kondo | E05B 47/0009 |
| | | | | 717/121 |
| 2007/0217105 | A1 * | 9/2007 | Christensen | H02H 3/025 |
| | | | | 361/89 |
| 2009/0073725 | A1 * | 3/2009 | Lin | H02M 3/33523 |
| | | | | 363/19 |
| 2010/0241286 | A1 * | 9/2010 | Thrornell-Pers | G05F 1/147 |
| | | | | 700/298 |
| 2012/0092894 | A1 * | 4/2012 | Navarro | H02P 13/06 |
| | | | | 363/13 |
| 2012/0206115 | A1 * | 8/2012 | Mathewson | G05F 1/14 |
| | | | | 323/257 |
| 2013/0057235 | A1 * | 3/2013 | Zizzo | H02P 9/008 |
| | | | | 323/255 |
| 2014/0009980 | A1 * | 1/2014 | Divan | H02M 5/4585 |
| | | | | 363/37 |
| 2014/0168827 | A1 * | 6/2014 | Mirzaei | H02H 3/253 |
| | | | | 361/31 |
| 2015/0103457 | A1 * | 4/2015 | Shander | H02J 3/381 |
| | | | | 361/88 |
| 2015/0103458 | A1 * | 4/2015 | Liffring | H02J 5/005 |
| | | | | 361/93.1 |
| 2015/0184640 | A1 | 7/2015 | Fortmann et al. | |
| 2016/0041568 | A1 * | 2/2016 | Daley | G05F 1/14 |
| | | | | 323/341 |
| 2016/0099653 | A1 * | 4/2016 | Divan | H02M 5/458 |
| | | | | 363/35 |
| 2016/0146191 | A1 | 5/2016 | Berroteran Gil et al. | |
| 2017/0274847 | A1 * | 9/2017 | Shander | B60R 16/03 |
| 2017/0302204 | A1 | 10/2017 | Yuan et al. | |
| 2019/0363657 | A1 * | 11/2019 | Hu | H02M 1/10 |
| 2020/0014317 | A1 * | 1/2020 | Hillebrandt | H02P 13/06 |

FOREIGN PATENT DOCUMENTS

| | | |
|---|---|---|
| EP | 2553788 A2 | 2/2013 |
| GB | 2410386 A | 7/2005 |
| WO | 2011120523 A2 | 10/2011 |
| WO | 2016165739 A1 | 10/2016 |

OTHER PUBLICATIONS

Danish Patent and Trademark Office 1st Technical Examination for Application No. PA 2018 70461 dated Jan. 18, 2019.

* cited by examiner

WIND TURBINE WITH AN ON-LOAD TAP CHANGER CONFIGURED WITH DYNAMIC FAULT CURRENT INJECTION

FIELD OF THE INVENTION

The invention relates to wind turbines, particularly to control of wind turbines configured with a transformer with a variable turns ratio.

BACKGROUND OF THE INVENTION

Wind turbines may be configured to support network faults by injection of higher levels of current during grid faults. However, fault current injection beyond nominal levels means that the wind turbine must source a high current when the network voltage is outside a certain voltage range. Such a functionality is widely required from the connected wind turbines by the regional power system operator's grid connection code. This implies that power converters must be designed to provide current above the nominal level when required during network faults.

Over-dimensioning of power converters increases investment costs without the benefit of increasing the nominal power production capability of the wind turbine.

Thus, it is a problem to provide an efficient design of wind turbines that meet grid connection codes with respect to current injecting requirements during network faults.

WO 2016/034178 A1 discloses a control system for a wind turbine. The control system defines reactive limits for a reactive power reference for the wind turbine. The reactive limits are defined as a function of a physical parameter, e.g. the output voltage of the wind turbine. In case the reactive power reference exceeds the predefined limits, the reactive power reference is limited. By limiting the reactive power reference output voltages which exceed certain output voltage limits may be avoided and, thereby, a disconnection of the WTG from the grid may be avoided.

Whereas WO 2016/034178 A1 relates to support of network faults there is still a need for improving the design of wind turbines in order to meet network support capabilities in an efficient way.

SUMMARY OF THE INVENTION

It is an object of the invention to improve wind turbines with respect to their current injection functions used and required during transmission network over- and under-voltage excursions, including network faults, like short-circuits and other network events. Particularly, it is an object to provide alternative, yet more efficient and economic solutions for addressing such wind turbine functions. It is another particular object to improve wind turbines' capability to remain connected to the network during network over-voltage excursions.

In a first aspect of the invention there is provided a method for operating a wind turbine which comprises a power generator, a power converter with a generator side converter and a line side converter, and a transformer with a secondary side winding connected to the line side converter and a primary side winding connected to a power network, where the transformer has a variable turns ratio which enables adjustment of a current ratio of a primary side current of the transformer and a secondary side current of the transformer, where the method comprises detecting a network voltage on the primary side or secondary side of the transformer being outside a pre-determined voltage range, determining a current reference for the primary side current based on the detected network voltage, controlling the power converter to generate an increase of the primary side current towards the current reference, and adjusting the turns ratio of the transformer to achieve a higher ratio of the current ratio.

Advantageously, the method enables adaptation of the secondary side voltage, i.e. the voltage seen by the line side converter, so that in case of network over- or under-voltage network events the deviation of the secondary voltage from a nominal voltage or acceptable voltage range can be minimized.

In case of network under-voltage events, e.g. faults, the network low voltage may influence the wind turbine's capability to generate the desired level of current to the network. By increasing the secondary side voltage, the transformer can be controlled via changes of the turns ratio to increase the current level injected to the network. In this way, the current injected to the network may be increased or at least possible reductions of injected current due to the fault can be alleviated.

Similarly, in case of network over-voltage events, the network high voltage may influence the converter's capability to generate the desired level of current. By reducing the voltage increase on the secondary side, i.e. the voltage increase due to the event the power converter may be continued to be operable, i.e. tripping of the power converter may be avoided. Furthermore, by decreasing the secondary side voltage, the converter's capability to generate current is improved during network over-voltage event. Furthermore, during the event, the transformer can be controlled via changes of the turns ratio to increase the current level injected to the network.

The increased current injected to the network during network over- and under-voltage network events may include increased reactive and/or active currents.

An increased generation of current from the power converter may be achieved as an increased reactive current (if required) at the sacrifice of a decreased active current, and vice versa.

The presence of a network fault may be detected via the detection of the network voltage via a primary or a secondary side voltage sensor, alternatively by a fault signal received by the wind turbine, e.g. provided by a wind park controller. The voltage sensors may be comprised by the wind turbine and/or other systems such as a common wind park controller.

The pre-determined voltage range may be an allowed voltage range, i.e. a range which includes a nominal voltage and allowed or acceptable voltage deviations from the nominal voltage.

The same voltage sensor is able to provide the actual network voltage caused by the voltage fault to enable determination of a current reference and possibly for controlling turns ratio changes of the transformer. Alternatively or additionally, the detection of the network event, possibly in combination with the detected voltage, may be used for initiating changes of the turns ratio and for controlling further changes of the turns ratio of the transformer.

Particularly, the dual actions of controlling the power converter to generate an increase of the primary side current and the adjustment of the current ratio, equivalent to adjusting the turns ratio, provides improved capabilities of the wind turbine to inject desired levels of current during network events and to keep the wind turbine operational. In this way the power converter, which has the fastest response time, can be used first to provide an increase of the current and subsequently the transformer can be controlled via tap changes to further increase the injected current, alternatively, to allow the power converter to reduce current generation.

By use of the transformer and its tap changer or other variable turns ratio functionality of the transformer, over-dimensioning of the power converter is not necessary or is less necessary.

According to an embodiment, the method comprises adjusting the current ratio of the transformer to generate a further increase of the primary side current towards the current reference until the primary side current reaches the current reference or until the current ratio cannot be increased further.

Advantageously, the changes of the turns ratio can be controlled on basis of the primary side current, which may be measured or estimated via calculations, to ensure that the turns ratio is not changed more than necessary. The first occurring condition, i.e. that the current reference is met or the turns ratio cannot be changed further, may be used for controlling the tap changer of the transformer, i.e. to stop further changes of the turns ratio.

According to an embodiment, the current reference is greater than a corresponding maximum current limit of the power converter. Advantageously, by setting the current reference to the desired level which may be higher than a corresponding maximum current limit of the power converter, the power converter can increase current generation according to predetermined rules, i.e. to either increase current up to its limit or possibly to allow generation of current above its maximum limit.

In this context, the corresponding maximum current limit of the power converter is a current limit which is comparable with the current reference. Thus, the current limit of the power converter may be defined as a secondary side current limit. Thus, in order to compare secondary and primary side values, either of them can be transferred to the other side via the known turns ratio.

According to an embodiment, the method comprises controlling the power converter to generate an increase of the primary side current towards the current reference, while allowing the power converter to generate current above the maximum current limit of the power converter.

Advantageously, by controlling the power converter to generate current above its normal maximum current limit, possibly for a limited period of time, a fast increase of the primary current can be achieved. In this way, the primary current reference can be met within a short time due to the contribution from the power converter until and while the transformer increases the primary current. When the transformer starts increasing the primary current via the switching of the tap changer the power converter can be controlled to reduce its current generation.

According to an embodiment, the method comprises controlling the power converter to adjust the primary side current towards the current reference, concurrently with the adjusting the turns ratio of the transformer to achieve the higher current ratio.

Advantageously, the simultaneous adjustments of the current generation from the power converter and the turns ratio enables more flexible, including fast and adaptive properties, of the current injection functionality during network events.

According to an embodiment, the adjusting of the turns ratio of the transformer to achieve the higher current ratio is continued until the current generated by the power converter has decreased to or below a nominal current level of the power converter or until the current ratio cannot be increased further.

Advantageously, concurrently with increasing the current ratio the current from the power converter is reduced so that its electrical and thermal load is gradually decreased to a normal level.

According to an embodiment, in response to detecting that the network voltage on the primary side or secondary side of the transformer has returned to a voltage inside the allowed voltage range, the method comprises determining a new current reference for the primary side current based on the detected network voltage, controlling the power converter to generate the primary side current according to the new current reference, and adjusting the turns ratio of the transformer to achieve a lower ratio of the current ratio until the current ratio reaches a nominal current ratio, while simultaneously controlling the power converter to maintain the primary side current close to the new current reference.

The new current reference may be equal to the pre-event primary current reference (i.e. the primary current reference in use prior to the detection of the network voltage being outside a pre-determined voltage range), or different from that, but at least lower that the primary current reference during the network event. The term pre-event is used to define the time prior to network over- and under-voltage event such as a network over- and under-voltage fault.

Since the power converter is controlled to generate current according to the new current reference, the primary current can return to the pre-event level or other desired level very fast. After the initial adaptation of the primary current to the new reference, the turns ratio and power converter current can be adjusted to nominal or normal values.

A second aspect of the invention relates to a control system for controlling a wind turbine which comprises a power generator, a power converter with a generator side converter and a line side converter, and a transformer with a secondary side winding connected to the line side converter and a primary side winding connected to a power network, where the transformer has a variable turns ratio which enables adjustment of a current ratio of a primary side current of the transformer and secondary side current of the transformer, where the control system is arranged to perform the steps according to the method according to the first aspect.

A third aspect of the invention relates to a computer program product comprising software code adapted to control a wind turbine when executed on a data processing system, the computer program product being adapted to perform the method according to the first aspect.

The computer program product may be provided on a computer readable storage medium or being downloadable from a communication network. The computer program product comprise instructions to cause the data processing system, e.g. in the form of a controller, to carry out the instruction when loaded onto the data processing system.

A fourth aspect of the invention relates to a wind turbine comprising a control system according to the second aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
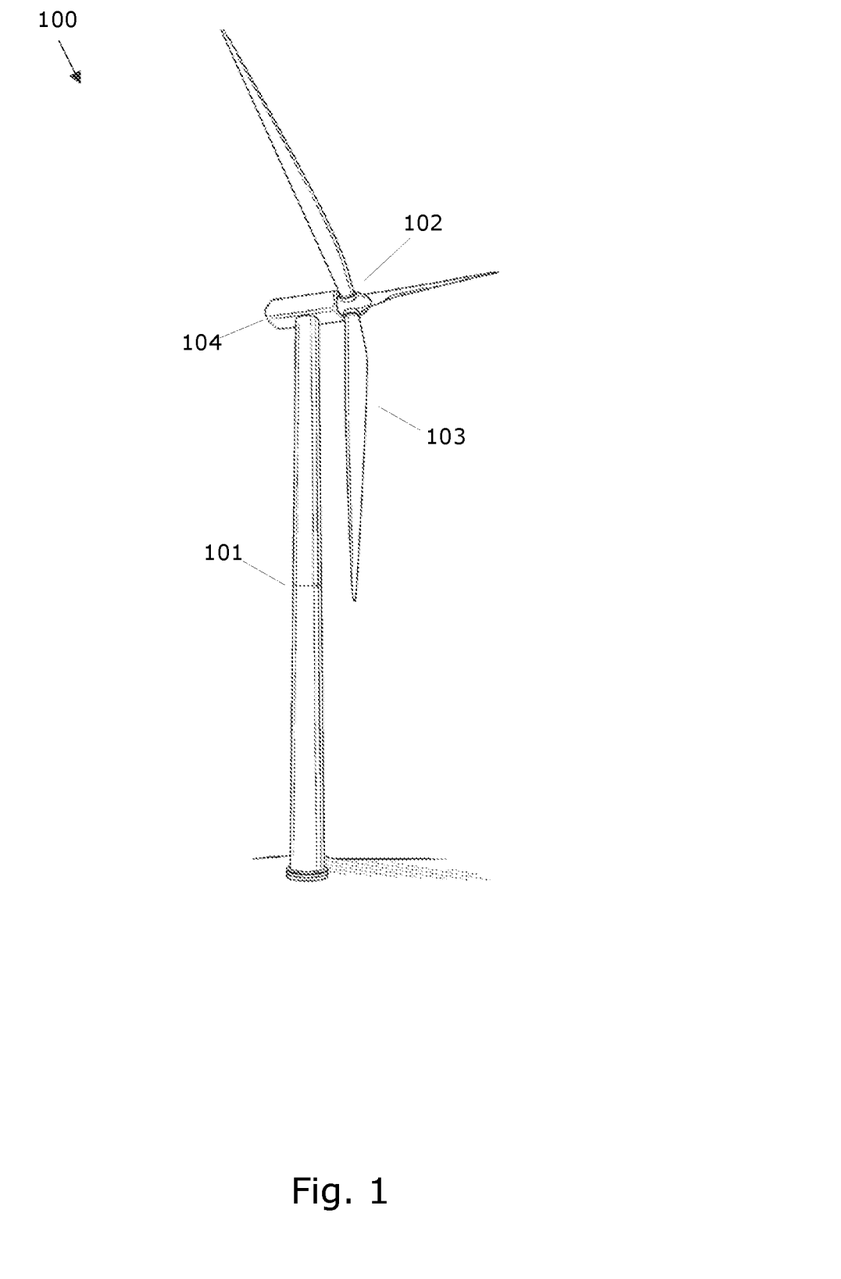
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a line side converter. The generator side converter converts the generator AC power into DC power and the line side converter converts the DC power into an AC power for injection into the power network.

Figure 2A:
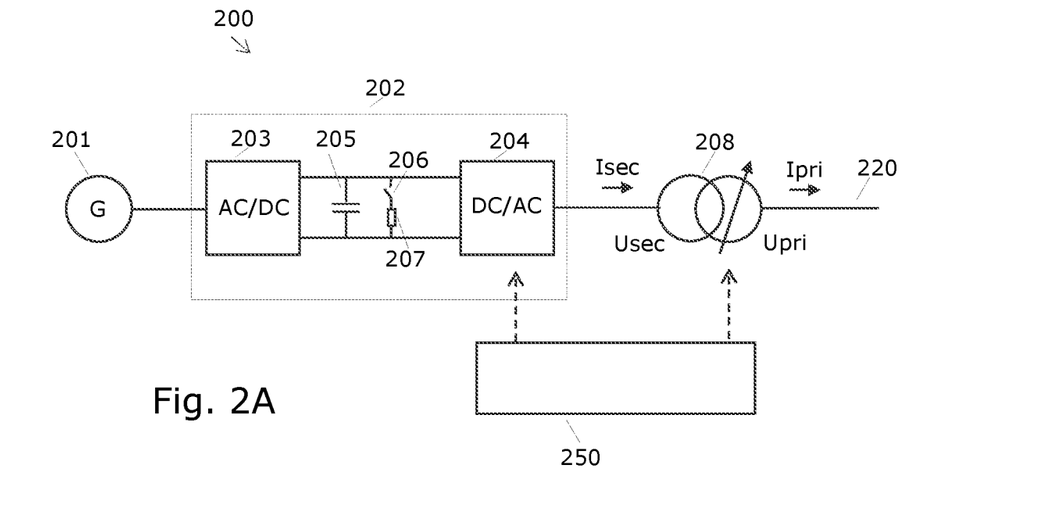
FIG. 2A shows a power system of a wind turbine.

FIG. 2A shows an example of a power system 200 of a wind turbine 100 according to an embodiment. The power system 200 comprises a generator 201 and a power converter 202. The power converter 202 comprises a generator side converter 203, a line side converter 204, a DC-link 205 and a resistor 207 connected with a controllable switch 206. The resistor and switch forms a power dissipation device, also known as a chopper, for dissipating active power. The DC-link 205 comprises one or more DC-link capacitors which are charged by the DC output current from the generator side converter 203 and which supplies DC power to the line side converter 204. The output AC current from the line side converter 204 is supplied via the wind turbine transformer 208 to the power line 220.

Figure 2B:
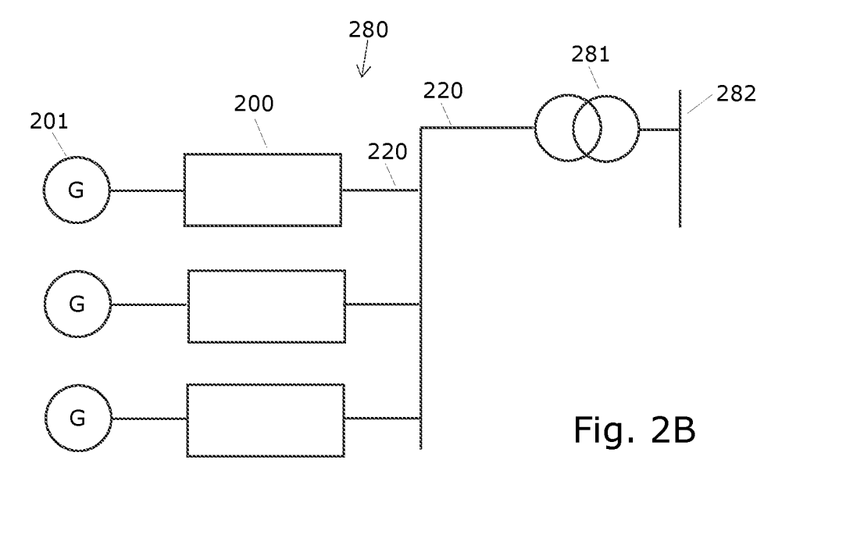
FIG. 2B shows a wind power plant arranged to supply power from the wind turbines to a high voltage transmission network.

The power line 220 may be a medium voltage cable power collection network which receives power from other wind turbines 100. The power line 220 may be connected with a high voltage transmission network 282 via a further transformer 281 as illustrated in FIG. 2B. Thus, the power line 220 and one or more power systems 200 of corresponding wind turbines constitutes a wind power plant or park 280 arranged to supply power to a utility grid, i.e. the high voltage transmission network 282.

In FIG. 2B, the transformer 281 is illustrated as a transformer with a fixed turns ratio. Alternatively, the transformer 281 may also have an on load tap changer on its high-voltage winding. The tap changer on the high voltage transformer 281 is significantly slower than the tap changer of the smaller turbine transformer 208. Embodiments of the invention may be combined with a wind power plant 280 which is configured with an OLTC transformer. Accordingly, a further aspect of the invention relates to wind power plant 280 with an on load tap changer transformer 281 and with one or more power systems 200 connected to the plant transformer 281 via the power line 220.

The high voltage transmission network is also commonly known as the high voltage grid, i.e. a power network for distribution of electrical power.

The power line 220 and high voltage transmission network 282 is commonly referred to as a network or power network.

The power converter 202 may be a full-scale converter configured according to different principles including forced-commutated and line-commutated converters. However, any embodiment described herein equally applies to doubly-fed induction generator configurations as well and other equivalents to such generator configurations and other AC-to-AC power converters.

The wind turbine transformer 208 is a variable turns ratio transformer which enables adjustment of the turns ratio, and thereby the voltage ratio between a primary side voltage Upri of the transformer and secondary side voltage Usec of the transformer. The transformer 208 is also known as an On Load Tap Changer transformer—in short an OLTC transformer 208—with its primary winding having several tapping points connecting to the On Load Tap Changer apparatus. The transformer's winding taps and the OLTC apparatus enable the turns ratio of the transformer to be varied. The OLTC apparatus switches the connection between transformer external leads and winding taps.

Since the variable turns ratio of primary and secondary windings of the transformer 208 equals the ratio between the primary and secondary voltages, i.e. the turns ratio Npri/Nsec equals Upri/Usec, this enables adaptation of the voltage seen by the line side converter 204. This can be used to provide network voltage support in situations of network voltage faults, i.e. in situations where the voltage on the high voltage transmission network increases or decreases outside a nominal voltage region. Such situations are commonly referred to as over-voltage and under-voltage ride through events.

Thus, the adjustable turns ratio can be used to maintain the secondary voltage Usec within an acceptable working range of the power converter 202, e.g. to avoid tripping of the power converter 202.

The turns ratio of the On Load Tap Changer Transformer can be changed while the transformer is loaded or unloaded. When loaded, the tap changer position may thus only be changed while the secondary side current Isec of the transformer is less than a switching current threshold. During static operation, i.e. during operation of the transformer where the tap position or turns ratio is not changed, the secondary side current may exceed the switching current threshold.

The power system 200 is principally illustrated and therefore does not explicitly reveal that the system may be a three phase system. However, principles of the described embodiments apply both to single and multi-phase systems.

FIG. 2A also shows a control system 250 for operating the wind turbine, particularly for controlling the line side converter 204 and the turns ratio of the OLTC 208.

The control system 250 may be configured so that changing the turns ratio of the transformer 208 is prohibited when the primary side current is above the switching current threshold.

The line side converter 204 uses some variant of pulse width modulation (PWM) for converting the DC power into AC power. The control system 250 is used for controlling the modulation of the line side converter 204 and for controlling the reactive current and the active current generated by the line side converter 204.

Thus, the control system 250 may determine a reference for the reactive and active currents to be produced by the power converter 202. The reference may be determined on basis of the network voltage Upri on the primary transformer side or the secondary transformer side voltage Usec and additionally on basis of a reference for reactive and/or active current or power provided by a central wind park controller.

The determination of the reference for the reactive current, or alternatively reactive power, may be determined based on predetermined charts such as QV charts that give the reactive current or power reference as a function of the measured primary or secondary voltage Upri, Usec. Similar predetermined PV charts may be used for determining the active current or power reference.

Figure 2C:
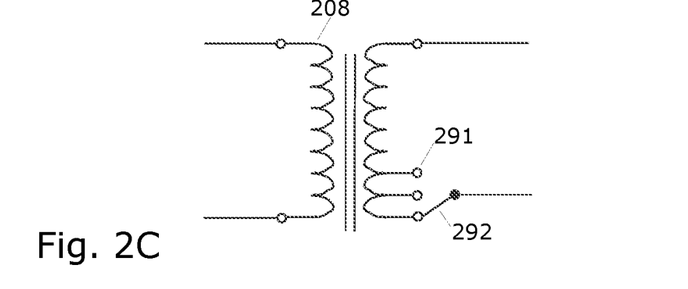
FIG. 2C shows an on load tap changer and associated transformer.

FIG. 2C illustrates an on load tap changer transformer 208 with taps 291 providing different turns ratios N_OLTC and a tap changer 292 arranged to be switched between different taps 291. There are multiple technologies for on load tap changer transformers. While these particular technologies are not described in detail here, they all exhibit the particular property that the tap changer can be switched and that the current during switching must be kept below a certain limit, defined by the OLTC apparatus ratings.

Figure 3:
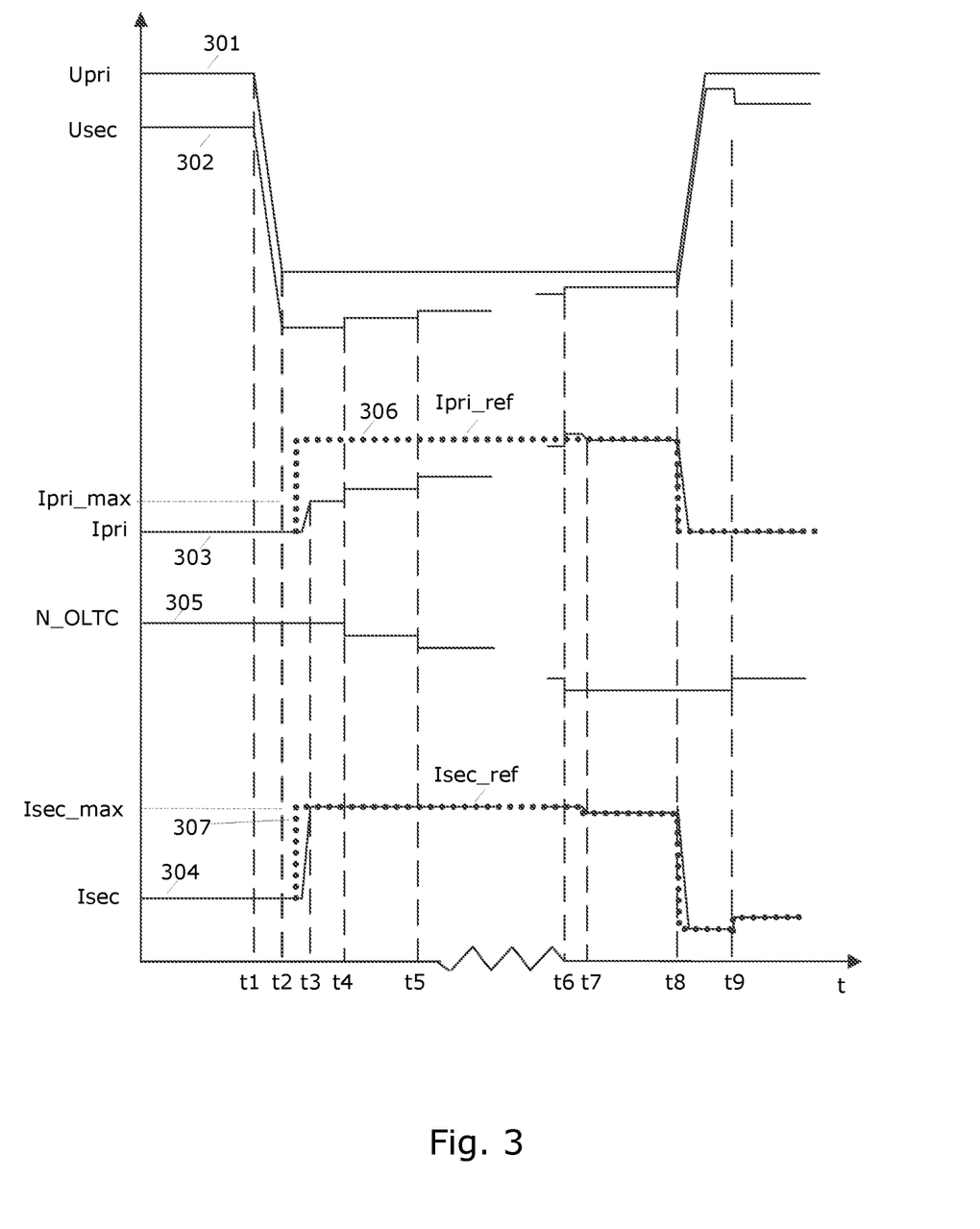
FIGS. 3-5 show various voltage and current curves as a function of time for illustration of various embodiments of the invention.

FIG. 3 illustrates an embodiment of the invention. Graph 301 shows the primary voltage Upri of the primary side of the transformer 208, graph 302 shows the secondary voltage Usec of the secondary side of the transformer 208, graph 303 shows the primary current Ipri in the primary transformer winding, graph 304 shows the secondary current Isec in the secondary transformer winding, graph 305 shows the turns ratio N_OLTC, graph 306 shows a current reference Ipri_ref for the primary current Ipri and graph 307 shows a current reference Isec_ref for the secondary current Isec.

It is noted that primary and secondary voltages as well as the primary and secondary currents are directly related via the turns ratio N_OLTC.

It is also noted that graphs 301-307 are not to scale and that the ordinate axis illustrate different physical quantities.

Before t1, the network voltage Upri is within a nominal range and the wind turbine produces current according to the available power.

At t1 a network event arises, here a network under-voltage network event, but could alternatively be a high voltage transmission network event. The network under-voltage network event directly influences the primary voltage Upri and thereby the secondary voltage Usec according to the turns ratio N_OLTC.

The voltage Upri and Usec and thereby the low or high network events may be obtained on basis of measured voltages from a voltage detector comprised by the control system 250.

Between t1 and t2, the primary and secondary voltages drop, while the power converter 202 approximately maintains the secondary current Isec.

Between t2 and t3, the network under-voltage network event is detected and after a short delay the current reference Ipri_ref for the primary current Ipri is adjusted according to the measured network voltage, i.e. the secondary or primary voltages Usec or Upri.

The detection of the network event may be performed by the control system 250 which detects that the network voltage, Usec or Upri, is a pre-determined voltage range such as a given allowed voltage range.

Here the current reference Ipri_ref is a current reference which is increased in order to compensate the network voltage drop.

The current reference Ipri_ref exceeds the maximum level of the allowable current from the line power converter 202. However, the power converter 202 responds to the new current reference Ipri_ref and increases the level of generated current up to its maximum current Ipri_max. The maximum current of the power converter 202 is denoted the maximum current limit Ipri_max on the primary side, which is equivalent to the maximum current limit Isec_max on the primary side.

Between t3 and t4, the transformer 208 responds to the detected low voltage Upri or Usec by changing the turns ratio N_OLTC in favor of an increased current ratio Ipri/Isec. The transformer 208 may be controlled by the control system 250 which detects the voltage fault (and recovery), adjusts the current reference Ipri_ref and controls the change of the turns ratio of the transformer 208.

Between t4 and t5, the tap position is changed to the next position to generate a further increase in the current ratio Ipri/Isec while the secondary current Isec is constant.

Between t5 and t6, the transformer ratio changes from t3 to t5 are continued until the tap position of the transformer 208 cannot be moved further or until the primary current Ipri has reached the reference Ipri_ref.

Between t6 and t7 the primary current has reached the reference Ipri_ref, here the primary current Ipri has slightly increased beyond the reference Ipri_ref due to the available turns ratios.

Between t7 and t8, the turns ratio N_OLTC is maintained and the power converter 202 adjusts the secondary current down due to the small difference between the primary current Ipri and the primary current reference Ipri_ref.

Between t8 and t9 the network voltage fault is cleared and the current reference Ipri_ref for the primary current Ipri is set a new current reference, e.g. the level prior to the network event. Because the turns ratio has changed, the corresponding secondary current Isec is lower than the level prior to the network event.

After a delay, at t9 the transformer 208 responds to the recovery of the network voltage and changes the turns ratio N_OLTC towards a nominal current ratio, e.g. the pre-event ratio, so that the secondary voltage Usec is decreased towards the pre-event voltage and so that secondary current is increased towards the pre-event current. Simultaneously with adjusting the turns ratio N_OLTC, the power converter is controlled to maintain the primary side current Ipri close to the new current reference Ipri_ref.

Accordingly, by use of the on load tap changer of the transformer 208, the secondary voltage Usec can be maintained within an acceptable voltage range, while the wind turbine provides increased current for supporting the network voltage fault.

Similar principles apply in case of high voltage transmission network event, except that the power converter 202 is controlled to supply inductive current instead of the capacitive current in the case of the network under-voltage network event. Thus, in the case of a network over-voltage event, between t3 and t4, the transformer 208 responds to the detected high voltage Upri or Usec by changing the turns ratio N_OLTC in favor of an increased current ratio Ipri/Isec in order to inject an increased inductive current.

The use of inductive and capacitive current may be ambiguous since phases of the current depend on signdefinitions of the system. However, in any case, during a network under-voltage event the system operated over-excited and during a network over-voltage event the system is operated under-excited.

It is noted that the references to the primary and secondary currents Ipri and Isec and their references Ipri_ref and Isec_ref refer to the active and/or reactive current components. Thus, as used herein, the current Ipri and Isec and their references Ipri_ref and Isec_ref may be defined as apparent current quantities which include active and reactive current components.

Figure 4:
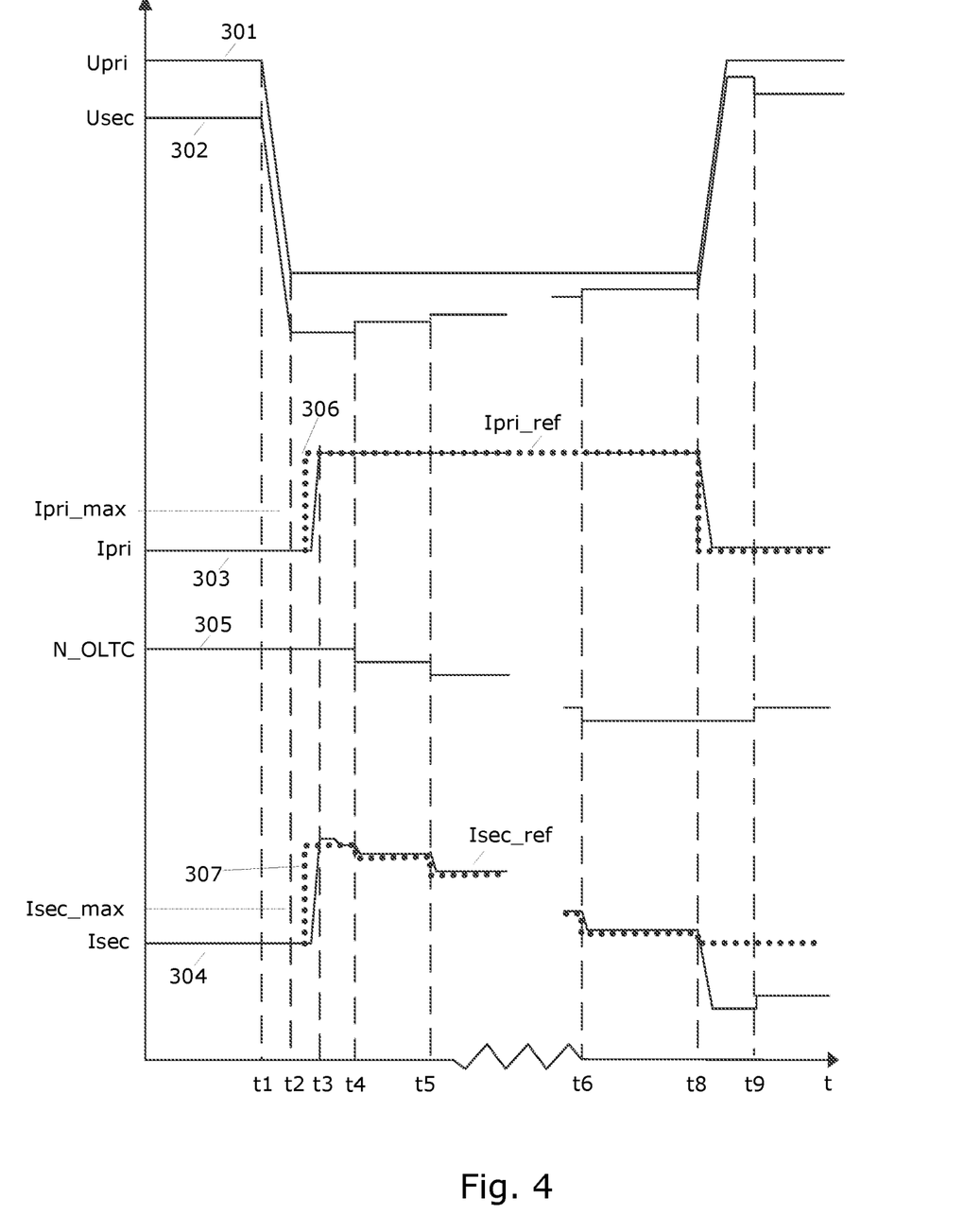
Figure 5:
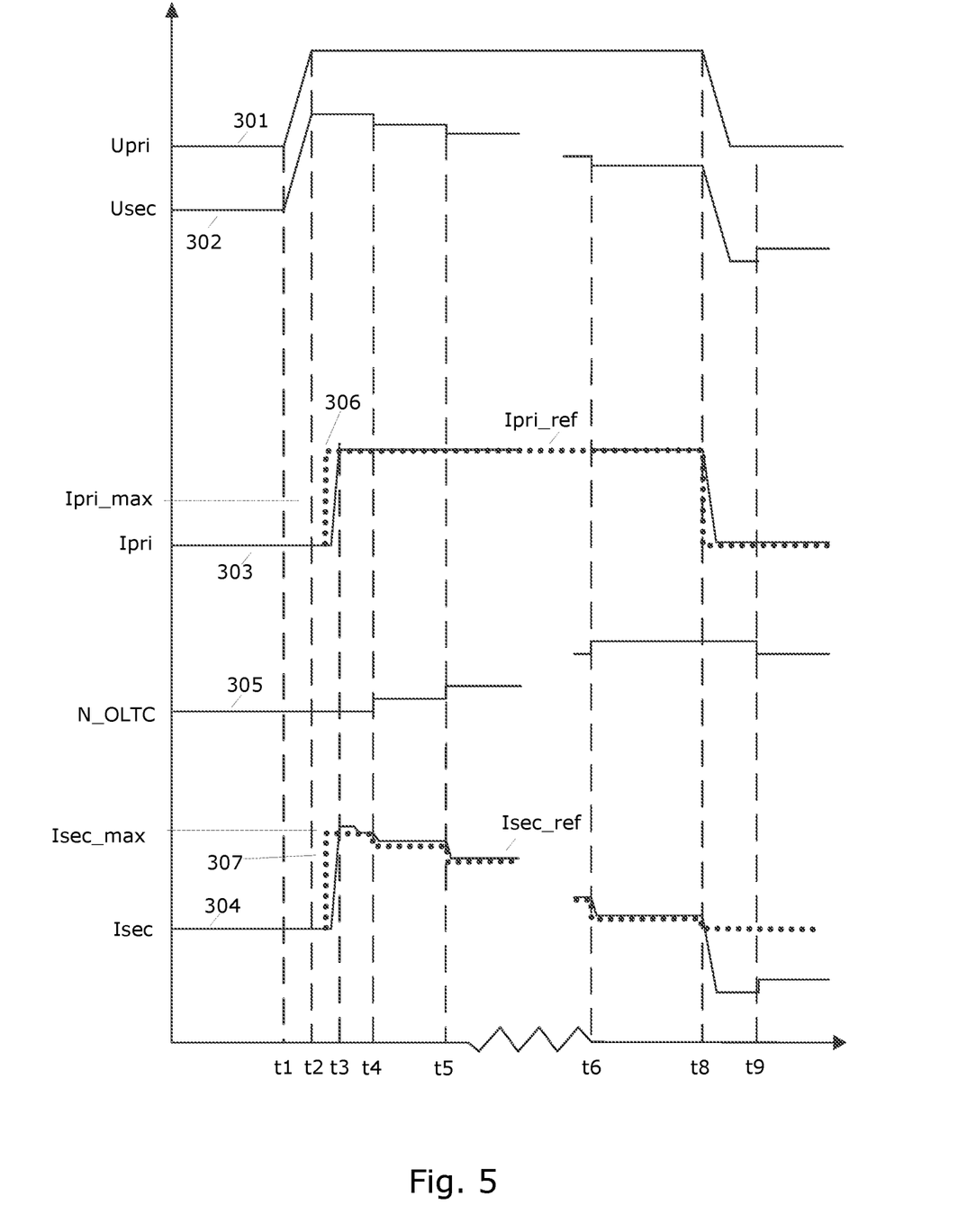

FIG. 4 and FIG. 5 illustrate alternative embodiments of the invention where the same graphs 301-307 as in FIG. 3 are used for illustrating the principle of the embodiments.

Before t1, the network voltage Upri is within a nominal range and the wind turbine produces current according to the available power.

At t1 a network event arises, a network under-voltage network event in FIG. 4 and a high voltage transmission network event in FIG. 5. The network under-voltage network event directly influences the primary voltage Upri and thereby the secondary voltage Usec according to the turns ratio N_OLTC.

Between t1 and t2, the primary and secondary voltages changes according to the voltage network event, while the power converter 202 approximately maintains the secondary current Isec.

Between t2 and t3, the network voltage fault is detected and after a short delay the current reference Ipri_ref for the primary current Ipri is adjusted according to the measured network voltage, i.e. the deviation of the secondary or primary voltages Usec or Upri from nominal voltages or acceptable voltage ranges.

In FIG. 4, due to the network voltage drop, the current reference Ipri_ref may comprise a capacitive current reference which is increased in order to compensate the network event.

In FIG. 5, due to the network voltage increase, the current reference Ipri_ref may comprise an inductive current reference which is increased in order to compensate the network event.

The current reference Ipri_ref exceeds the maximum level of the allowable current from the line power converter 202, i.e. from the line side converter 204.

Thus, so far, until the determination of the current reference, Ipri_ref, the method of FIGS. 4-5 is identical with the method of FIG. 3.

However, according to the principles of FIGS. 4-5 and different from the principle of FIG. 3, the power converter 202 responds to the new current reference Ipri_ref and increases the level of generated current above its maximum current Ipri_max. As illustrated in the example of FIGS. 4-5, the power converter 202 increases the current up to the current reference, Ipri_ref. However, in other examples, the power converter 202 increases the current up to a level between the maximum current Ipri_max of the power converter and the determined urrent reference Ipri_ref.

The period of time where the generation of current above the maximum current Ipri_max is limited according to specification of the power converter 202.

Between t3 and t4, the transformer 208 responds to the detected low voltage Upri or Usec by changing the turns ratio N_OLTC in favor of an increased current ratio Ipri/Isec. Hence, the power converter 202 can start reducing the secondary current Isec while the primary current Ipri is maintained at the reference level Ipri_ref. That is, the turns ratio would cause an increase in the primary current Ipri—however, this increase is compensated by the simultaneous reduction of the secondary current Isec.

The adjustment of the turns ratio N_OLTC gradually increases the secondary voltage Usec.

Between t4 and t5, the tap position is changed to the next position to generate a further increase in the current ratio Ipri/Isec while the secondary current Isec is constant or substantially constant.

Between t5 and t6 the changes from t3 to t5 is continued until the tap position of the transformer 208 cannot be moved further or until the secondary current Isec has reached a level at or below the nominal current level of the power converter 202, e.g. the current Isec generated prior to the network event, or alternatively, until the secondary current Isec has reached a level at or below the maximum secondary current limit Isec_max.

Between t6 and t8 (t7 is not included in FIGS. 4-5) the current levels and turns ratio is maintained.

Between t8 and t9 the network voltage fault is cleared and the current reference Ipri_ref for the primary current Ipri is set a new current reference, e.g. the level prior to the network event. Because the turns ratio has changed, the corresponding secondary current Isec is lower than the level prior to the network event. The power converter 202 controls the generated secondary current Isec so that the primary current Ipri approaches the primary current reference Ipri_ref.

After a delay, at t9 the transformer 208 responds to the recovery of the network voltage and changes the turns ratio N_OLTC towards a nominal current ratio, e.g. the pre-event ratio, so that the secondary voltage Usec is decreased towards the pre-event voltage and so that secondary current is increased towards the pre-event current. Simultaneously with adjusting the turns ratio N_OLTC, the power converter is controlled to maintain the primary side current Ipri close to the new current reference Ipri_ref.

FIG. 5 differs from FIG. 4 in that the turns ratio N_OLTC is adjusted so that the secondary voltage Usec is gradually decreased during the network event, and so that the secondary voltage Usec is increased towards the pre-event voltage after the recovery of the network voltage.

During the over-voltage event, the turbine aims to reduce the voltage amplitude by operating as under-excited, i.e. by sourcing inductive current. If the network impedance of the network 220, 281, 282 is predominantly resistive rather than inductive, the turbine can reduce the voltage amplitude by a reduction of its current amplitude (not illustrated).

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine which comprises a power generator, a power converter with a generator side converter and a line side converter, and a transformer with a secondary side winding connected to the line side converter and a primary side winding connected to a power network, where the transformer has a variable turns ratio which enables adjustment of a current ratio of a primary side current of the transformer and a secondary side current of the transformer, where the method comprises:
- detecting a network voltage on the primary side or secondary side of the transformer being outside a predetermined voltage range,
- determining a current reference for the primary side current based on the detected network voltage,
- controlling the power converter to generate an increase of the primary side current towards the current reference, and
- adjusting the turns ratio of the transformer to achieve a higher ratio of the current ratio.

2. The method for controlling the wind turbine according to claim 1, further comprising adjusting the current ratio of the transformer to generate a further increase of the primary side current towards the current reference until the primary side current reaches the current reference or until the current ratio cannot be increased further.

3. The method for controlling the wind turbine according to claim 1, where the current reference is greater than a corresponding maximum current limit of the power converter.

4. The method for controlling the wind turbine according to claim 3, further comprising controlling the power converter to generate an increase of the primary side current towards the current reference, while allowing the power converter to generate current above the maximum current limit of the power converter.

5. The method for controlling the wind turbine according to claim 4, further comprising controlling the power converter to adjust the primary side current towards the current reference, concurrently with the adjusting of the turns ratio of the transformer to achieve the higher current ratio.

6. The method for controlling the wind turbine according to claim 5, where the adjusting of the turns ratio of the transformer is continued until the current generated by the power converter has decreased to or below a nominal current level of the power converter or until the current ratio cannot be increased further.

7. The method for controlling the wind turbine according to claim 1, further comprising, in response to detecting that the network voltage on the primary side or secondary side of the transformer has returned to a voltage inside the allowed voltage range,
- determining a new current reference for the primary side current based on the detected network voltage,
- controlling the power converter to generate the primary side current according to the new current reference, and
- adjusting the turns ratio of the transformer to achieve a lower ratio of the current ratio until the current ratio reaches a nominal current ratio, while simultaneously controlling the power converter to maintain the primary side current close to the new current reference.

8. A control system for controlling a wind turbine which comprises a power generator, a power converter with a generator side converter and a line side converter, and a transformer with a secondary side winding connected to the line side converter and a primary side winding connected to a power network, where the transformer has a variable turns ratio which enables adjustment of a current ratio of a primary side current of the transformer and secondary side current of the transformer, where the control system is configured to perform an operation, comprising:
- detecting a network voltage on the primary side or secondary side of the transformer being outside a predetermined voltage range;
- determining a current reference for the primary side current based on the detected network voltage;
- controlling the power converter to generate an increase of the primary side current towards the current reference; and
- adjusting the turns ratio of the transformer to achieve a higher ratio of the current ratio.

9. The control system of claim 8, the operation further comprising adjusting the current ratio of the transformer to generate a further increase of the primary side current towards the current reference until the primary side current reaches the current reference or until the current ratio cannot be increased further.

10. The control system of claim 8, wherein the current reference is greater than a corresponding maximum current limit of the power converter.

11. The control system of claim 10, the operation further further comprising controlling the power converter to generate an increase of the primary side current towards the current reference, while allowing the power converter to generate current above the maximum current limit of the power converter.

12. A computer program product comprising software code adapted to perform an operation for controlling a wind turbine when executed on a data processing system; the wind turbine a power generator, a power converter with a generator side converter and a line side converter, and a transformer with a secondary side winding connected to the line side converter and a primary side winding connected to a power network, where the transformer has a variable turns ratio which enables adjustment of a current ratio of a primary side current of the transformer and secondary side current of the transformer; the operation, comprising:
- detecting a network voltage on the primary side or secondary side of the transformer being outside a predetermined voltage range;
- determining a current reference for the primary side current based on the detected network voltage;
- controlling the power converter to generate an increase of the primary side current towards the current reference; and
- adjusting the turns ratio of the transformer to achieve a higher ratio of the current ratio.

13. The computer program product of claim 12, wherein the operation further comprises adjusting the current ratio of the transformer to generate a further increase of the primary side current towards the current reference until the primary side current reaches the current reference or until the current ratio cannot be increased further.

14. The computer program product of claim 12, wherein the current reference is greater than a corresponding maximum current limit of the power converter.

15. The computer program product of claim 14, the operation further comprising controlling the power converter to generate an increase of the primary side current towards the current reference, while allowing the power converter to generate current above the maximum current limit of the power converter.

\* \* \* \* \*